US012171297B2

(12) United States Patent
Tateishi

(10) Patent No.: US 12,171,297 B2
(45) Date of Patent: Dec. 24, 2024

(54) CUSHION AND SHOE

(71) Applicant: ASICS CORPORATION, Kobe (JP)

(72) Inventor: Junichiro Tateishi, Kobe (JP)

(73) Assignee: ASICS CORPORATION, Kobe (JP)

( * ) Notice: Subject to any disclaimer, the term of this patent is extended or adjusted under 35 U.S.C. 154(b) by 513 days.

(21) Appl. No.: 17/131,687

(22) Filed: Dec. 22, 2020

(65) Prior Publication Data
US 2021/0195993 A1 Jul. 1, 2021

(30) Foreign Application Priority Data
Dec. 27, 2019 (JP) ................................ 2019-238124

(51) Int. Cl.
A43B 1/00 (2006.01)
A43B 7/144 (2022.01)
A43B 7/32 (2006.01)
A43B 13/04 (2006.01)
A43B 13/12 (2006.01)
A43B 13/18 (2006.01)
A43B 13/22 (2006.01)
C08J 9/00 (2006.01)
C08L 23/08 (2006.01)
C08L 53/00 (2006.01)
C08L 53/02 (2006.01)
B32B 27/30 (2006.01)
B32B 27/32 (2006.01)

(52) U.S. Cl.
CPC .......... A43B 13/127 (2013.01); A43B 1/0072 (2013.01); A43B 7/144 (2013.01); A43B 7/32 (2013.01); A43B 13/04 (2013.01); A43B 13/188 (2013.01); A43B 13/223 (2013.01); C08J 9/0061 (2013.01); C08L 23/0815 (2013.01); C08L 23/0853 (2013.01); C08L 53/00 (2013.01); C08L 53/02 (2013.01); C08J 2323/08 (2013.01); C08J 2325/10 (2013.01); C08J 2423/08 (2013.01); C08L 2203/14 (2013.01); C08L 2205/025 (2013.01); C08L 2205/04 (2013.01)

(58) Field of Classification Search
CPC . C08J 9/0061; C08J 2423/08; C08L 23/0815; C08L 23/0853
See application file for complete search history.

(56) References Cited

U.S. PATENT DOCUMENTS

| 4,977,200 | A | 12/1990 | Itoh et al. |
|---|---|---|---|
| 2003/0194575 | A1 | 10/2003 | Tau et al. |
| 2004/0082750 | A1 | 4/2004 | Tau et al. |
| 2005/0054800 | A1 | 3/2005 | Tau et al. |
| 2006/0004167 | A1 | 1/2006 | Tau et al. |
| 2007/0249798 | A1 | 10/2007 | Stevens et al. |
| 2008/0269388 | A1 | 10/2008 | Markovich et al. |
| 2009/0239014 | A1 | 9/2009 | Noguchi et al. |
| 2013/0340280 | A1 | 12/2013 | Swigart et al. |
| 2015/0143723 | A1* | 5/2015 | Tateishi ............... A43B 13/187 521/149 |
| 2019/0231026 | A1 | 8/2019 | Fujita et al. |
| 2020/0362084 | A1 | 11/2020 | Masuda et al. |

FOREIGN PATENT DOCUMENTS

| CA | 3 072 874 A1 | 5/2019 | |
|---|---|---|---|
| CN | 101883819 A | 11/2010 | |
| JP | H01-249847 A | 10/1989 | |
| JP | 2000-136285 A | 5/2000 | |
| JP | 2000-169666 A | 6/2000 | |
| JP | 2004107519 A * | 4/2004 | |
| JP | 2005120335 A * | 5/2005 | |
| JP | 2011-016907 A | 1/2011 | |
| JP | 2018-080236 A | 5/2018 | |
| JP | 2019065170 A * | 4/2019 | |
| WO | 2009/072553 A1 | 6/2009 | |
| WO | 2018070045 A1 | 4/2018 | |
| WO | 2018/180319 A1 | 10/2018 | |
| WO | WO-2018181137 A1 * | 10/2018 | ............. A43B 13/04 |

OTHER PUBLICATIONS

Machine Translation of WO2018180319A1. Apr. 10, 2018. (Year: 2018).*
Machine Translation of JP2019-065170A. Apr. 25, 2019. (Year: 2019).*
Lucant Information. Mitsui Chemicals. https://www.mitsuichem.com/en/service/mobility/elastomers/lucant/index.htm. As viewed on May 7, 2019. (Year: 2019).*
Machine Translation of WO2018/181137A1. Apr. 10, 2018. (Year: 2018).*
Machine Translation of JP2004-107519A. Apr. 8, 2004. (Year: 2004).*
Machine Translation of JP2005-120335A. May 12, 2005 (Year: 2005).*
The extended European search report issued by the European Patent Office on May 7, 2021, which corresponds to European Patent Application No. 20217162.5-1005 and is related to U.S. Appl. No. 17/131,687.
An Office Action; "Notice of Reasons for Refusal", mailed by the Japanese Patent Office on Dec. 10, 2021, which corresponds to Japanese Patent Application No. 2019-238124 and is related to U.S. Appl. No. 17/131,687; with English language translation.
An Office Action; "Notice of Reasons for Refusal", mailed by the Japanese Patent Office on Mar. 18, 2022, which corresponds to Japanese Patent Application No. 2019-238124 and is related to U.S. Appl. No. 17/131,687; with English language translation.
Communication pursuant to Article 94(3) EPC issued by the European Patent Office on Jun. 1, 2022, which corresponds to European Patent Application No. 20217162.5-1015 and is related to U.S. Appl. No. 17/131,687.

(Continued)

Primary Examiner — Stephen E Rieth
(74) Attorney, Agent, or Firm — Studebaker & Brackett PC

(57) ABSTRACT

Provided is a cushion partially or entirely composed of a foam, wherein the foam is composed of: a hydrocarbon-based oil including ethylene and α-olefin as constituent units; and a polymer composition including one or a plurality of polymers.

6 Claims, 4 Drawing Sheets

(56) References Cited

OTHER PUBLICATIONS

An Office Action mailed by China National Intellectual Property Administration on Feb. 15, 2023, which corresponds to Chinese Patent Application No. 202011379772.2 and is related to U.S. Appl. No. 17/131,687; with English language translation.

* cited by examiner

CUSHION AND SHOE

CROSS-REFERENCE TO RELATED APPLICATION

This application claims priority to Japanese Patent Application No. 2019-238124, the disclosure of which is incorporated herein by reference in its entirety.

FIELD

The present invention relates to a cushion and a shoe, more specifically, relates to a cushion partially or entirely composed of a foam and a shoe including such a cushion.

BACKGROUND

Conventionally, cushions or the like having a soft elastic body composed of a polymer composition or cushions having a foam are used for sporting goods or the like. As such members or parts for cushioning, for example, a soft member having a low hardness arranged in a shoe sole part is known as described in WO 2018/070045.

SUMMARY

It is an object of the present invention to provide a cushion excellent in cushioning properties, and hence to provide a shoe excellent in cushioning performance.

For improving the basic understanding on the some features of the invention of the present application, a brief summary of the present invention will be described below. This summary does not show the outline of the present invention, and is not intended to specify the main or important features of the present invention or to limit the scope of the present invention. The purpose thereof is only to provide some of basic concepts of the invention in a simplified style as a premise of the subsequent detailed description of the invention.

In order to solve the aforementioned problem, the present invention provides a cushion partially or entirely composed of a foam, wherein the foam is composed of a hydrocarbon-based oil including ethylene and α-olefin as constituent units, and a polymer composition including one or a plurality of polymers.

The present invention also provides a shoe including a shoe sole that includes the aforementioned cushion.

BRIEF DESCRIPTION OF DRAWINGS

The aforementioned features and the other features of the present invention will be clarified by the following description and figures illustrating the embodiments of the present invention.

DESCRIPTION OF EMBODIMENTS

In general, there is a demand for a cushion composed of a foam and the like, in which the foam has a low hardness for exhibiting excellent cushioning properties. In order to produce the foam having a low hardness, there is a case where the foam is composed of a polymer composition including oil such as paraffin oil. However, the foam thus made to have a low hardness may have an excessively high compression set and thereby be insufficient in recovering properties from compressive deformation.

When the cushion arranged in a shoe sole is compressed by the wear's weight and kept compressed, the cushioning properties are greatly reduced. Thus, in a conventional foam, an advantage which is obtainable by reducing the hardness is lost by the compressive deformation, and therefore there is caused a problem that sufficiently good cushioning properties are hardly exhibited. Such a problem is not limited only to the cushion for a shoe. The present invention has been achieved to suppress occurrence of such a problem.

Figure 1:
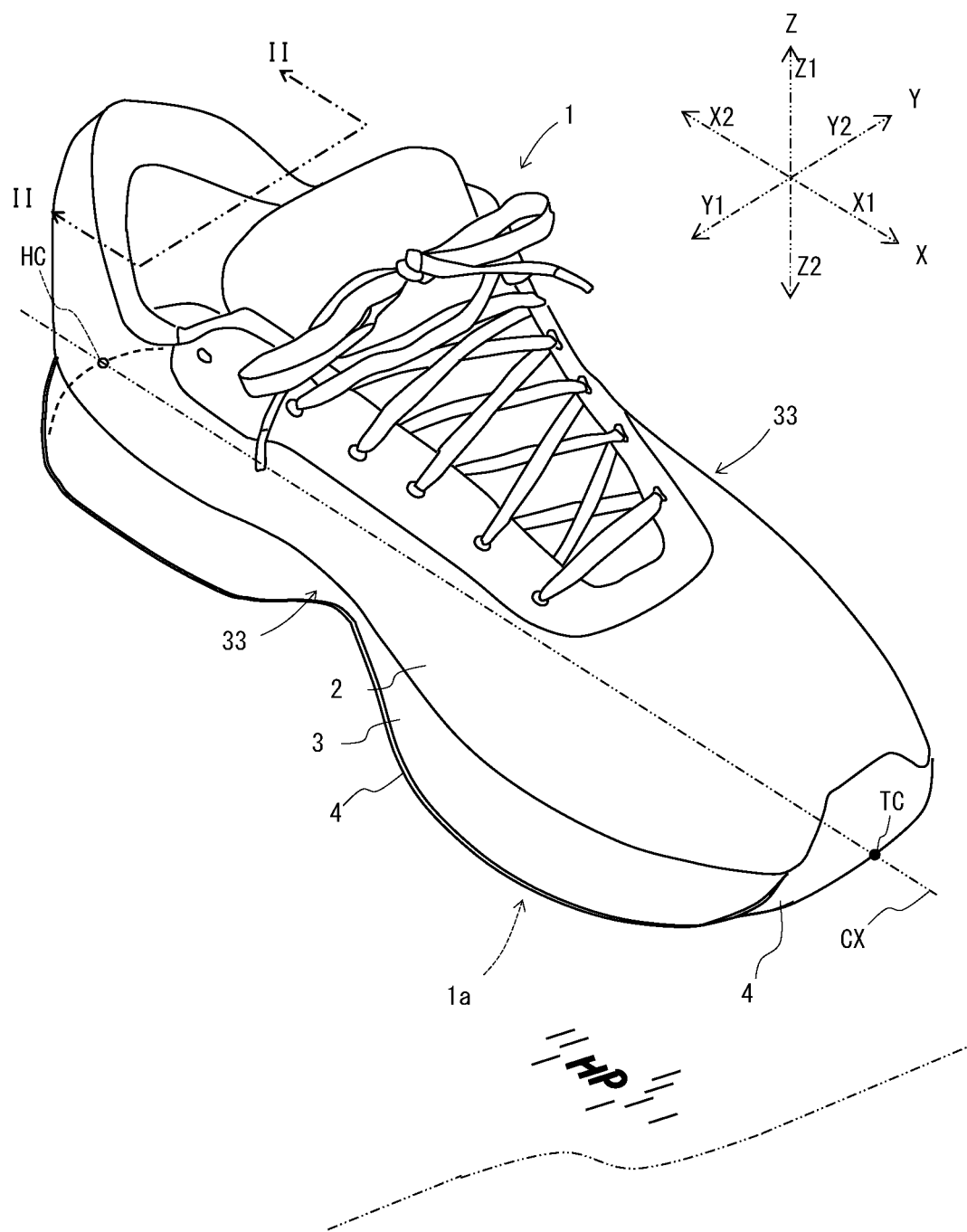
FIG. 1 is a schematic perspective view showing an example of a shoe including a cushion according to an embodiment.

Hereinafter, a shoe member of the present invention will be described by way of embodiments. FIG. 1 shows a shoe that is at least partially composed of a shoe member of this embodiment. The shoe 1 includes an upper 2 and a shoe sole member. The shoe 1 includes a midsole 3 and an outsole 4 as the shoe sole member.

Hereinafter, when a description is given on, for example, the shoe 1 shown in FIG. 1, a direction along a shoe center axis CX connecting a heel center HC and a toe center TC may be referred to as a length direction X. Among directions along the shoe center axis CX, a direction X1 directed from the heel to the toe may be referred to as, for example, a forward direction, and a direction X2 directed from the toe to the heel may be referred to as, for example, a rearward direction. Among directions orthogonal to the shoe center axis CX, a direction parallel to a horizontal plane HP may be referred to as, for example, a width direction Y. Regarding the width direction Y, a direction Y1 directed to the first toe side may be referred to as, for example, a medial side direction, and a direction Y2 directed to the fifth toe side may be referred to as, for example, a lateral side direction. A vertical direction Z orthogonal to the horizontal plane HP may be referred to as a thickness direction or a height direction. Further, hereinafter, a direction Z1 directed upward in this vertical direction Z may be referred to as an upward direction, and a direction Z2 directed downward may be referred to as a downward direction.

Figure 2:
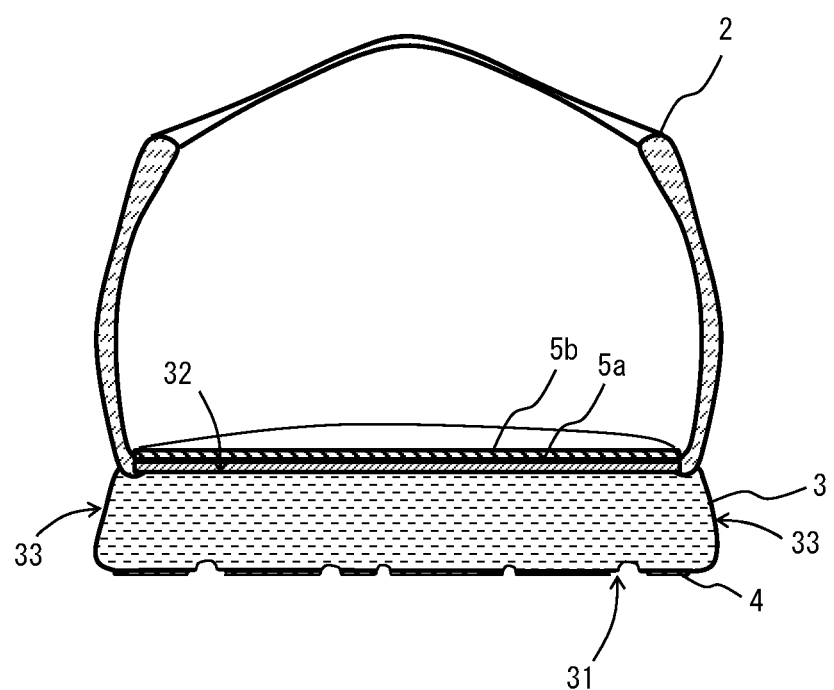
FIG. 2 is a schematic cross-sectional view showing an arrangement of the cushion (i.e., a cross-sectional view taken along the line and viewed in the direction of arrows II-II thereof in FIG. 1).

As shown in FIG. 1 and FIG. 2, the shoe 1 of this embodiment includes the outsole 4 in its bottommost position. The outsole 4 constitutes the ground engaging surface of the shoe 1. The shoe 1 includes the midsole 3 between the outsole 4 and the upper 2 that covers a foot of a wearer from the upper side. The midsole 3 of this embodiment has a flat shape, and is arranged so that the thickness direction thereof corresponds to the height direction Z of the shoe. The shoe 1 of this embodiment further includes an inner sole 5a that covers an upper surface of the midsole 3 and a sock liner 5b that is arranged on the upper side of the inner sole 5a.

A lower surface 31 of the midsole 3 is in contact with an upper surface of the outsole 4, and an upper surface 32 of the midsole 3 is in contact with the inner sole 5a from below.

Side portions 33 of the midsole 3 are in an exposed state without being covered with, for example, the upper 2 or the outsole 4.

The shoe 1 of this embodiment is provided with a shoe sole in which the midsole 3 serves as a cushion having excellent cushioning properties. That is, the cushion is arranged in the shoe 1 of this embodiment to give excellent cushioning properties over the entire area in the length direction and the width direction of the shoe sole.

The midsole 3 of this embodiment is entirely composed of the foam. The foam constituting the midsole 3 of this embodiment is composed of a polymer composition. The polymer composition of this embodiment includes, as essential components, a hydrocarbon-based oil, and a polymer that serves as a base material of the polymer composition. In this embodiment, forming the foam with the polymer composition including a specific hydrocarbon-based oil enables the midsole 3 (i.e., cushion) to exhibit excellent cushioning properties. The polymer composition further includes, for example, a foaming agent. The polymer composition may include inorganic fillers as an optional component. The polymer composition may include, for example, a crosslinking agent in the case where a base polymer is crosslinked.

The base polymer is not particularly limited, but preferably any one of ethylene-vinyl acetate copolymer (EVA), ethylene-α-olefin block copolymer (OBC), ethylene-α-olefin random copolymer (POE), and styrene-based thermoplastic elastomer (TPS). That is, in this embodiment, it is preferable that one or more polymers selected from the group consisting of ethylene-vinyl acetate copolymer (EVA), ethylene-α-olefin block copolymer (OBC), ethylene-α-olefin random copolymer (POE), and styrene-based thermoplastic elastomer (TPS) be included in the polymer composition.

The polymer composition of this embodiment may include not only a plurality of different polymers, but also a plurality of the same polymers. That is, the polymer composition may include, for example, a plurality of ethylene-vinyl acetate copolymers (EVA) respectively containing different contents of vinyl acetate. Further, the polymer composition may include, for example, ethylene-α-olefin random copolymer (POE) polymerized by Ziegler-Natta catalyst and ethylene-α-olefin random copolymer (POE) polymerized by metallocene catalyst. Moreover, the polymer composition may include a plurality of hydrocarbon-based oils and a plurality of inorganic fillers.

The polymer composition preferably includes ethylene-vinyl acetate copolymer (EVA). That is, among the ethylene-vinyl acetate copolymer (EVA), the ethylene-α-olefin block copolymer (OBC), the ethylene-α-olefin random copolymer (POE), and the styrene-based thermoplastic elastomer (TPS), it is preferable that at least the ethylene-vinyl acetate copolymer (EVA) be included in the polymer composition.

The polymer composition preferably includes both of ethylene-α-olefin block copolymer (OBC) and ethylene-vinyl acetate copolymer (EVA).

When the total mass of all polymers included per unit volume is X0 and the total mass of the ethylene-α-olefin block copolymer (OBC) and the ethylene-vinyl acetate copolymer (EVA) is X1, it is preferable that the polymer composition of this embodiment satisfy formula (1) below:

$$(X1/X0) \times 100(\%) \geq 50(\%) \qquad (1).$$

That is, the total amount of the ethylene-α-olefin block copolymer (OBC) and the ethylene-vinyl acetate copolymer (EVA) relative to all the aforementioned polymers is preferably 50 mass % or more. The aforementioned ratio is more preferably 60 mass % or more, still more preferably 70 mass % or more, particularly preferably 80 mass % or more. The aforementioned ratio may be even 90 mass % or more, 95 mass % or more, or may be even 100 mass %.

When comparing the ethylene-α-olefin block copolymer (OBC) with the ethylene-vinyl acetate copolymer (EVA), the ethylene-vinyl acetate copolymer (EVA) tends to more significantly exhibit the effect of the present invention.

When the mass of the ethylene-α-olefin block copolymer (OBC) included per unit volume is X11, and the mass of the ethylene-vinyl acetate copolymer (EVA) included per unit volume is X12, it is preferable that the polymer composition satisfy formula (2) below:

$$X12 > X11 \qquad (2).$$

In other words, when the total mass (X11+X12) of the ethylene-α-olefin block copolymer (OBC) and the ethylene-vinyl acetate copolymer (EVA) is X1, it is preferable that the polymer composition satisfy formula (3) below:

$$(X12/X1) \times 100(\%) \geq 50(\%) \qquad (3).$$

That is, the ratio of the mass of the ethylene-vinyl acetate copolymer (EVA) (X12) relative to the total mass (X1) of the ethylene-α-olefin block copolymer (OBC) and the ethylene-vinyl acetate copolymer (EVA) is preferably more than 50 mass %. The aforementioned ratio is more preferably 60 mass % or more, still more preferably 70 mass % or more, particularly preferably 80 mass % or more. The aforementioned ratio may be even 90 mass % or more, 95 mass % or more, or may be even 100 mass %.

The ethylene-vinyl acetate copolymer (EVA) is preferably a random copolymer. In order to enable the polymer composition to exhibit flexibility and adhesion properties, the content ratio of vinyl acetate (VA content) of the ethylene-vinyl acetate copolymer (EVA) is preferably 8 mass % or more, more preferably 10 mass % or more, still more preferably 15 mass % or more. The content ratio of vinyl acetate is preferably 35 mass % or less, more preferably 30 mass % or less. The content of the vinyl acetate preferably lies in a range set with a lower limit selected from the aforementioned lower limits and an upper limit selected from the aforementioned upper limits.

A Type A durometer hardness (instantaneous value) stipulated in JIS K 6253-3 of the ethylene-vinyl acetate copolymer (EVA) is preferably 92 or less. The aforementioned durometer hardness of the ethylene-vinyl acetate copolymer (EVA) is more preferably 90 or less, still more preferably 88 or less. The aforementioned durometer hardness of the ethylene-vinyl acetate copolymer (EVA) is preferably 75 or more, more preferably 80 or more. The aforementioned durometer hardness of the ethylene-vinyl acetate copolymer (EVA) preferably lies in a range set with a lower limit selected from the aforementioned lower limits and an upper limit selected from the aforementioned upper limits.

The ethylene-α-olefin block copolymer (OBC) is preferably ethylene-α-olefin copolymer having a density of more than 0.86 g/cm$^3$ and less than 0.89 g/cm$^3$. A melting point (melting peak temperature) obtained by DSC method (heating rate at 10° C./min) of the ethylene-α-olefin block copolymer (OBC) is preferably 115° C. or more and 125° C. or less.

The ethylene-α-olefin block copolymer (OBC) is suitable as a polymer for allowing olefin to generate micro crystals. The ethylene-α-olefin block copolymer (OBC) is preferably either ethylene-hexane block copolymer or ethylene-octene block copolymer. In this embodiment, the ethylene-α-olefin block copolymer included in the polymer composition is more preferably ethylene-octene block copolymer. The ethylene-α-olefin block copolymer (OBC) is preferably a copolymer obtained by polymerization of ethylene and α-olefin having 4 or more carbon atoms in the presence of two different polymerization catalysts and a chain transfer agent (i.e., shuttling agent described in WO 2005/090426 and WO 2005/090427) such as alkylaluminum or alkyl zinc compound. The copolymer thus obtained will be referred to as chain shuttling copolymer.

In a block copolymer, a plurality of blocks each composed of the same monomers are present in one molecule. A common block copolymer has blocks respectively having short lengths, and the lengths are greatly different from each other between one block and another block, which makes it hard to generate a crystal. Even if a crystal is generated, the crystal has greatly different structures from the structure of a crystal obtained by forming a homopolymer from monomers forming each block. During the polymerization of the chain shuttling copolymer, each of homopolymerization and block copolymerization is repeated multiple times, so that blocks formed during the proceeding of the hompolymerization have lengths equal to or longer than a certain length. Further, since the blocks of the chain shuttling copolymer have a substantially uniform length, a crystal similar to the crystal obtained by forming a homopolymer from monomers that constitute each block can be easily formed. Specifically, the chain shuttling copolymer of ethylene and 1-octene block includes, in a molecule, ethylene blocks capable of being crystallized similarly to high density polyethylene (HDPE) which is an ethylene homopolymer. Accordingly, the ethylene-octene block copolymer, which is a chain shuttling copolymer, may include many fine crystals having the same structure as that of crystals of high density polyethylene. The fine crystals are effective for allowing the foam to exhibit excellent strength. The ethylene-octene block copolymer effectively functions to form a large number of such crystals in a part or member composed by the polymer composition. In other words, the ethylene-α-olefin block copolymer preferably shows a melting point similar to that of the high density polyethylene (HDPE), and a melting point (melting peak temperature) obtained by DSC method (heating rate at 10° C./min) of the ethylene-α-olefin block copolymer is preferably 115° C. or more and 125° C. or less.

The durometer hardness of the ethylene-α-olefin block copolymer (OBC) is preferably 85 or less, more preferably 80 or less. The durometer hardness of the ethylene-α-olefin block copolymer (OBC) is preferably 50 or more, more preferably 55 or more.

In the case where the ethylene-α-olefin random copolymer (POE) is included in the polymer composition, the ethylene-α-olefin random copolymer (POE) preferably has a low crystallinity and a density of more than 0.86 g/cm$^3$ and less than 0.91 g/cm$^3$. The melting point (melting peak temperature) obtained by DSC method (heating rate at 10° C./min) of the ethylene-α-olefin random copolymer (POE) is preferably 50° C. or more and 95° C. or less.

The aforementioned durometer hardness of the ethylene-α-olefin random copolymer (POE) is preferably 96 or less, more preferably 94 or less, still more preferably 92 or less. The aforementioned durometer hardness of the ethylene-α-olefin random copolymer (POE) is preferably 50 or more, more preferably 60 or more. The aforementioned durometer hardness of the ethylene-α-olefin random copolymer (POE) preferably lies in a range set with a lower limit selected from the aforementioned lower limits and an upper limit selected from the aforementioned upper limits.

In the case where the styrene-based thermoplastic elastomer (TPS) is included in the polymer composition, the styrene-based thermoplastic elastomer (TPS) may be, for example, styrene-ethylene-butylene copolymer (SEB), styrene-butadiene-styrene copolymer (SBS), hydrogen additive of SBS (styrene-ethylene-butylene-styrene copolymer (SEBS)), styrene-isoprene-styrene copolymer (SIS), hydrogen additive of SIS (styrene-ethylene-propylene-styrene copolymer (SEPS)), styrene-butadiene-isoprene-styrene copolymer (SBIS), hydrogen additive of SBIS (styrene-ethylene-ethylene propylene-styrene-copolymer (SEEPS)), styrene-isobutylene-styrene-copolymer (SIBS), styrene-butadiene-styrene-butadiene (SBSB), or styrene-butadiene-styrene-butadiene-styrene (SBSBS).

The aforementioned durometer hardness of the styrene-based thermoplastic elastomer (TPS) is preferably 96 or less, more preferably 90 or less, still more preferably 80 or less. The aforementioned durometer hardness of the styrene-based thermoplastic elastomer (TPS) is preferably 50 or more, more preferably 55 or more. The aforementioned durometer hardness of the styrene-based thermoplastic elastomer (TPS) preferably lies in a range set with a lower limit selected from the aforementioned lower limits and an upper limit selected from the aforementioned upper limits.

Other than the above components, the polymer composition may further include, for example, a fluorine-based polymer such as a fluorine resin or a fluorine rubber; a polyamide-based polymer such as a polyamide resin such as polyamide 6, polyamide 11, polyamide 12, polyamide 6,6 or polyamide 610, or a polyamide-based elastomer; a polyester-based resin such as polyethylene terephthalate or polybutylene terephthalate; a polyvinyl chloride resin; an acrylic resin such as polymethyl methacrylate; silicone-based elastomer; butadiene rubber (BR); isoprene rubber (IR); chloroprene (CR); natural rubber (NR); styrene butadiene rubber (SBR); acrylonitrile butadiene rubber (NBR); or butyl rubber (IIR).

The polymer composition of this embodiment may be, for example, a polyethylene resin such as a low-density polyethylene resin (LDPE), a linear low-density polyethylene resin (LLDPE), or a high density polyethylene resin (HDPE); a polypropylene resin such as propylene homopolymer (homo PP), a random polypropylene resin (random PP), or a block polypropylene resin (block PP); cyclic olefin polymer (COP); cyclic olefin copolymer (COC); a polyurethane-based polymer such as a polyester-based polyurethane resin or a polyether-based polyurethane resin; or a styrene-based polymer such as a polystyrene-resin, an acrylonitrile styrene-resin (AS resin), or an acrylonitrile butadiene styrene resin (ABS resin).

As described above, the hydrocarbon-based oil is included in the polymer composition. The hydrocarbon-based oil of this embodiment includes ethylene and α-olefin as constituent units and is a co-oligomer in the form of liquid at normal temperature (23° C.). Examples of the α-olefin include α-olefin having 3 or more carbon atoms, such as propylene, 1-buten, 1-hexene, or 1-octene.

The hydrocarbon-based oil preferably does not include a monomer having a polar group other than ethylene and α-olefin. Propylene is suitable for the α-olefin of the hydrocarbon-based oil of this embodiment. That is, ethylene propylene copolymer (ethylene propylene co-oligomer) is suitable for the hydrocarbon-based oil.

It is preferable that the hydrocarbon-based oil be not bonded to a polymer by crosslinking and be a saturated hydrocarbon-based oil substantially having no double bond. It can be confirmed by measuring iodine value based on JIS K0070 that the hydrocarbon-based oil has no double bond. The iodine value of the saturated hydrocarbon-based oil is, for example, preferably 5 (g/100 g) or less, more preferably 3 (g/100 g) or less, still more preferably 1 (g/100 g) or less, particularly preferably 0 (g/100 g).

The hydrocarbon-based oil effectively functions to allow the foam composed of the polymer composition to exhibit excellent flexibility. The hydrocarbon-based oil also effectively functions to improve the characteristics of the foam relating to the compression set.

In order to allow the hydrocarbon-based oil to exhibit the aforementioned functions more significantly, a mass average molecular weight (Mw) of the hydrocarbon-based oil is preferably 1,000 or more, more preferably 1,500 or more, still more preferably 2,000 or more. The mass average molecular weight (Mw) is determined as a corresponding value based on the standard styrene by the gel permeation chromatography (GPC) method. The mass average molecular weight (Mw) of the hydrocarbon-based oil is preferably 10,000 or less, more preferably 9,000 or less, still more preferably 8,000 or less. The mass average molecular weight of the hydrocarbon-based oil preferably lies in a range set with a lower limit selected from the aforementioned lower limits and an upper limit selected from the aforementioned upper limits.

The hydrocarbon-based oil preferably has a certain degree of a bulk molecular structure. In order to allow the hydrocarbon-based oil to exhibit the aforementioned functions more significantly, a kinetic viscosity obtained according to JIS Z8803 at a temperature of 40° C. of the hydrocarbon-based oil is preferably 300 mm$^2$/s or more, more preferably 400 mm$^2$/s or more, still more preferably 500 mm$^2$/s or more, particularly preferably 1,000 mm$^2$/s or more. The aforementioned kinetic viscosity is preferably 50,000 mm$^2$/s or less, more preferably 40,000 mm$^2$/s or less, still more preferably 35,000 mm$^2$/s or less. The aforementioned kinetic viscosity of the hydrocarbon-based oil preferably lies in a range set with a lower limit selected from the aforementioned lower limits and an upper limit selected from the aforementioned upper limits.

When the content of all the polymers included in the polymer composition other than the hydrocarbon-based oil is 100 mass parts, the hydrocarbon-based oil may be included in the polymer composition at a ratio of 1 mass part or more and 50 mass parts or less. The ratio of the hydrocarbon-based oil is preferably 3 mass parts or more, more preferably 5 mass parts or more. The ratio of the hydrocarbon-based oil is preferably 30 mass parts or less, more preferably 25 mass parts or less, still more preferably 20 mass parts or less. The ratio of the hydrocarbon-based oil preferably lies in a range set with a lower limit selected from the aforementioned lower limits and an upper limit selected from the aforementioned upper limits.

The polymer composition may further include, for example, a reinforcement material such as inorganic fillers or fibers, a coupling agent for improving affinity between the reinforcement material and a resin, or the like. The polymer composition may include, for example, an adhesion improving agent such as a rosin or an acid-modified polymer. The polymer composition may further include, for example, an antiaging agent, an antioxidant, a weather-proof agent, an ultraviolet absorbent, a light stabilizer, a flame retardant, a pigment, a mold releasing agent, an electrostatic preventing agent, an antimicrobial agent, a fungicidal agent, a deodorizer, a fragrance, or the like.

Examples of the inorganic fillers include silica particles, alumina particles, talc particles, clay particles, calcium carbonate particles, magnesium carbonate particles, aluminum hydroxide particles, and magnesium hydroxide particles. The inorganic fillers may be included in the polymer composition at a ratio of 1 mass % or more and 20 mass % or less. In this embodiment, it is preferable that calcium carbonate particles be included at a ratio of 1 mass % or more and 20 mass % or less.

Examples of the fibers include: aliphatic polyamide fibers such as polyamide 6 fibers, polyamide 6,6 fibers, polyamide 11 fibers, or polyamide 12 fibers; aromatic polyamide fibers such as poly-p-phenylene terephthalamide fibers or poly-m-phenylene isophthalamide fibers; polyolefin fibers such as polyethylene fibers or polypropylene fibers; polyester fibers such as polyethylene terephthalate fibers, polybutylene terephthalate fibers, polyethylene naphthalate fibers, polybutylene naphthalate fibers, polylactate fibers, or polyarylate fibers; polyphenylene sulfide fibers, polyurethane fibers, acrylic fibers, poly(para-phenylene benzobisoxazole) fibers, polyimide fibers, polyvinyl alcohol fibers, and fluorine resin fibers.

Examples of the fibers include cotton fibers, linen fibers, silk fibers, wool fibers, cellulose fibers, acetate fibers, and rayon fibers. The fibers may be, for example, carbon nanofibers or cellulose nanofibers.

Examples of the coupling agent include a silane coupling agent and a titanate coupling agent.

Examples of the rosin include a tall rosin, a gum rosin, and a wood rosin.

Examples of the acid-modified polymer include a copolymer of a polar monomer such as maleic acid anhydride or maleic acid ester, and an olefin-based monomer such as ethylene, propylene, or α-olefin having 4 or more carbon atoms. The copolymer may be a block copolymer or a random copolymer, in which the polar polymer constitutes a main chain, or a graft copolymer, in which the polar polymer constitutes a side chain. The copolymer may be a copolymer including three or more monomers composed of a plurality of olefin-based monomers and one or more polar monomers, as constituent units.

As described above, the foam constituting the midsole 3 may include the foaming agent. The foam may have been crosslinked or may include a crosslinking agent or a crosslinking aid.

Examples of the foaming agent include an azo compound such as azodicarbonamide (ADCA), 1,1'-azobis(1-acetoxy-1-phenylethane), dimethyl-2,2'-azobisbutyrate, dimethyl-2, 2'-azobisisobutyrate, 2,2'-azobis(2,4,4-trimethylpentane), 1,1'-azobis(cyclohexane-1-carbonitrile), or 2,2'-azobis[N-(2-carboxyethyl)-2-methyl-propionamidine]; a nitroso compound such as N,N'-dinitrosopentamethylenetetramine (DPT); a hydrazine derivative such as 4,4'-oxybis(benzenesulfonylhydrazide) or diphenylsulfone-3,3'-disulfonylhydrazide; a semicarbazide compound such as p-toluenesulfonyl semicarbazide; and an organic heat decomposable foaming agent such as trihydrazinotriazine.

The foaming agent may be, for example, a thermally decomposable inorganic foaming agent that can be: a bicarbonate such as sodium bicarbonate or ammonium bicarbonate, or a carbonate such as sodium carbonate or ammonium carbonate; a nitrite such as ammonium nitrite; or a hydrogen compound.

In the case where the foaming agent is a thermally decomposable foaming agent as described above, the polymer composition may include, for example, a foaming aid such as a metal oxide-based foaming aid like zinc oxide, a urea-based foaming aid, a salicylic foaming aid, or a benzoic foaming aid.

The foaming agent may be, for example, an organic foaming agent of aliphatic hydrocarbons such as methanol, ethanol, propane, butane, pentane, or hexane, or an inorganic foaming agent such as air, carbon dioxide, nitrogen, argon, or water.

Examples of the crosslinking agent include an organic peroxide such as dicumyl peroxide, di-t-butyl peroxide, 2,5-dimethyl-2,5-di-4-butylperoxykexane, 2,5-dimethyl-2,5-di-4-butylperoxykexane-3, 1,3-bis(t-butylperoxyisopropyl)benzene, 1,1-bis(t-butylperoxy)-3,3,5-trimethylcyclohexane, n-butyl-4,4-bis(t-butylperoxy)valerate, benzoyl peroxide, p-chlorobenzoyl peroxide, 2,4-dichlorobenzoyl peroxide, t-butyl peroxybenzoate, t-butylperoxyisopropyl carbonate, diacetyl peroxide, lauroyl peroxide, or t-butylcumyl peroxide.

Examples of the crosslinking aid include divinylbenzene, trimethylolpropane trimethacrylate, 1,6-hexanediol methacrylate, 1,9-nonanediol dimethacrylate, 1,10-decanediol dimethacrylate, triallyl trimellitate ester, triallyl cyanurate (TAC), triallyl isocyanurate (TAIL), neopentylglycol dimethacrylate, triallyl 1,2,4-benzenetricarboxylate ester, tricyclodecane dimethacrylate, and polyethyleneglycol diacrylate.

The contents of the foaming agent and the crosslinking agent in the polymer composition at the time of forming the foam may be appropriately adjusted depending on the degree of foaming or the degree of crosslinking required for the foam.

In order to allow the shoe 1 to exhibit excellent lightweight properties, the midsole 3 of this embodiment is preferably composed of a foam having a density value of 0.5 g/cm$^3$ or less, which is measured by the method A "Underwater displacement" of JIS K 7112 at a temperature of 23° C. The density of the foam is more preferably 0.35 g/cm$^3$ or less, still more preferably 0.30 g/cm$^3$ or less, particularly preferably 0.25 g/cm$^3$ or less. The density can be measured using a hydrometer having a mechanism for preventing floating of samples, and can be measured, for example, using a commercially available hydrometer from Alfa Mirage Co., Ltd., as a high-precision electronic hydrometer.

An Asker C hardness of the foam constituting the midsole 3 is preferably 60 or less, more preferably 55 or less, still more preferably 50 or less, particularly preferably 45 or less. The Asker C hardness of the foam is generally 10 or more.

The density and the Asker C hardness of the foam can be generally measured for the part of the foam excluding a film, a high density part or the like which is likely to be formed on the surface part at the time of producing the foam.

The value of the compression set of the foam is preferably 52% or less, more preferably 50% or less, still more preferably 48% or less, particularly preferably 46% or less. The value of the compression set of the foam is generally 15% or more.

The compression set of the foam can be obtained according to ASTM D395A (constant load test). Specifically, the compression set herein means a value obtained by applying a pressure of 0.59 MPa to a measurement sample for 22 hours at a temperature of 23° C., and measuring the thickness of the measurement sample after a lapse of 30 hours after the measurement sample is released from the pressure.

The midsole 3 of this embodiment exhibits comfortability by absorbing a shock applied to a heel when the wearer wearing the shoe including the midsole 3 walks or runs. Further, even if the midsole 3 of this embodiment is subjected to compressive deformation by a load of a wearer, the midsole 3 shows good recovering properties when the midsole 3 is released from the load. Therefore, the midsole 3 of this embodiment can exhibit good cushioning properties over a long period of time.

In the shoe 1 of this embodiment, another foam may be provided in the shoe sole as a cushion in addition to the foam that constitutes the midsole 3.

In the shoe 1 of this embodiment, at least one of the inner sole 5a and the sock liner 5b may be partially or entirely composed of the foam as described above to exhibit excellent cushioning properties in addition to the midsole 3.

In the shoe 1 of this embodiment, as an alternative to the midsole 3, at least one of the inner sole 5a and the sock liner 5b may be partially or entirely composed of the foam as described above to exhibit excellent cushioning properties.

Figure 3:
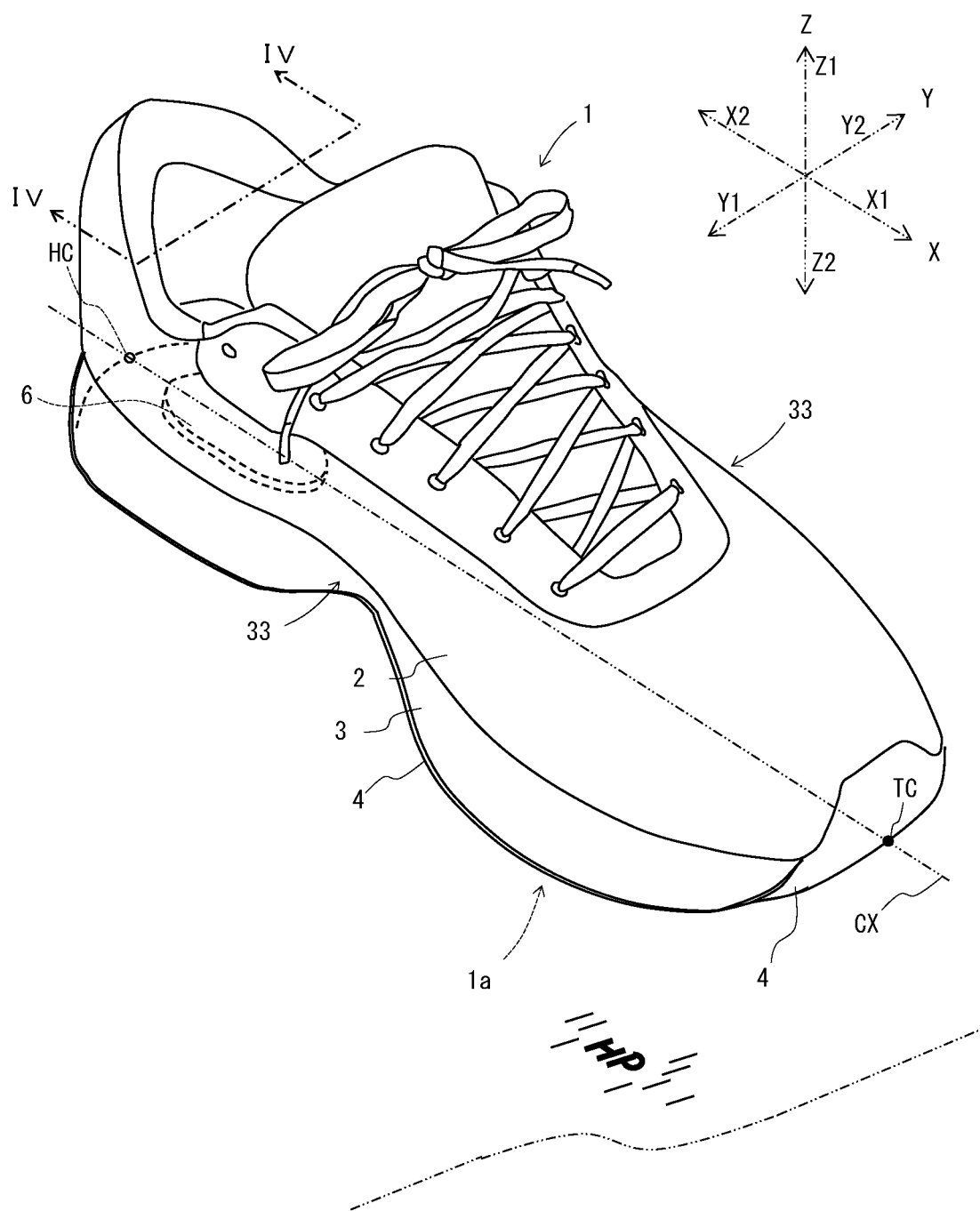
FIG. 3 is a schematic perspective view showing an example of a shoe including a cushioning part according to another form different from FIG. 1.
Figure 4:
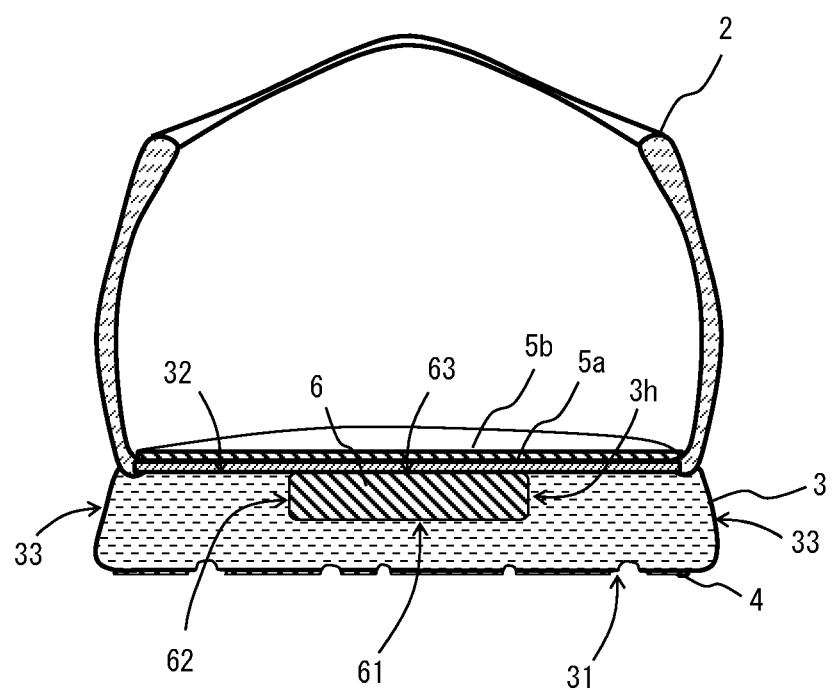
FIG. 4 is schematic cross-sectional view showing an arrangement of the cushion (i.e., a cross-sectional view taken along the line and viewed in the direction of arrows IV-IV thereof in FIG. 3).

In the shoe 1 of this embodiment, another foam for serving as a cushion may be arranged at a position where the midsole 3 is arranged, in addition to the foam that constitutes the midsole 3. The shoe having such a formation will be described with reference to FIG. 3 and FIG. 4. In FIG. 3 and FIG. 4, the common reference numbers are allocated to the parts or members having the same configurations as the shoe 1 shown FIG. 1 and FIG. 2. Hereinafter, the description for the same configuration as the shoe 1 shown FIG. 1 and FIG. 2 will not be repeated.

The midsole 3 of the shoe 1 shown in FIG. 3 and FIG. 4 includes a recessed part 3h that is located in an area (i.e., heel support area), to which a load is applied through a heel of a wearer, and is open upwardly. In the shoe 1, another foam in addition to the foam that constitutes the midsole 3 is placed in the recessed part 3h as a shock absorbing material 6. In this embodiment, the shock absorbing material 6 is provided in the shoe sole as a cushion. The shock absorbing material 6 is arranged to have a lower surface 61 in contact with a bottom surface of the recessed part 3h, a peripheral surface 62 in contact with a peripheral wall of the recessed part 3h, and a top surface 63 forming a single plane with the upper surface 32 of the midsole 3. That is, the shock absorbing material 6 of this embodiment is formed to have a smaller area than the midsole 3 when viewed from the top and have a smaller thickness than the midsole 3 when viewed from the side.

The top surface 63 of the shock absorbing material 6 may not necessarily form the single plane with the upper surface 32 of the midsole 3. For example, the shock absorbing material 6 may be embedded inside the midsole 3.

The shock absorbing material 6 of this embodiment may be also arranged in any part other than the heel part. In this embodiment, as an example, the shock absorbing material 6 is entirely composed of the foam, but the cushion according to the present invention may be, for example, a composite body of a foam and a sheet body, such as a composite body having a sandwich structure in which a foam is sandwiched between two fiber sheets. Further, the cushion according to the present invention may be a composite body having a structure different from that of the aforementioned composite body.

As described above, the cushion of this embodiment is partially or entirely composed of a foam, wherein the foam is composed of: a hydrocarbon-based oil including ethylene and α-olefin as constituent units; and a polymer composition including one or a plurality of polymers.

In this embodiment, the foam which partially or entirely constitutes the cushion includes the hydrocarbon-based oil to be excellent in characteristics relating to the compression set and show a low hardness. This configuration according to this embodiment enables the cushion to exhibit excellent cushioning performance.

In this embodiment, the polymer may be one or more selected from the group consisting of ethylene-vinyl acetate copolymer, ethylene-α-olefin block copolymer, ethylene-α-olefin random copolymer, and styrene-based thermoplastic elastomer. This polymer is advantageous in reducing the weight of the foam because it has a low specific gravity.

In this embodiment, the polymer may include the ethylene-vinyl acetate copolymer. The ethylene-vinyl acetate copolymer is relatively easily foamed at a high expansion ratio. Further, the ethylene-vinyl acetate copolymer provides an advantageous effect of forming a foam excellent in adhesion properties.

In this embodiment, the hydrocarbon-based oil may be a saturated hydrocarbon-based oil. The saturated hydrocarbon-based oil as the hydrocarbon-based oil can minimize the change in characteristics of the foam with time.

In this embodiment, the cushion is applied to a shoe as an example, but the cushion of the present invention is not necessarily applied only to the shoe and is available for a wide range of applications. That is, the present invention is not limited to the aforementioned exemplification in any way.

EXAMPLES

Next, the present invention will be described in more detail by way of Examples, but not limited thereto.
<Compound Materials>
The following compound materials were prepared for preparing polymer compositions.
1) Polymer
   1a: Ethylene-vinyl acetate copolymer having a vinyl acetate content (VA) of 15 mass % and a Type A durometer hardness of 94
   1b: Ethylene-vinyl acetate copolymer having a vinyl acetate content (VA) of 25 mass % and a Type A durometer hardness of 88
   1c: Ethylene-α-olefin random copolymer (POE) that is a random copolymer including ethylene and α-olefin as constituent units and having a Type A durometer hardness of 95
   1d: Ethylene-α-olefin block copolymer (OBC) that is a chain shuttling copolymer including ethylene and α-olefin as constituent units and having a melting point (mp) of 119° C. and a Type A durometer hardness of 64
   1e: Styrene-ethylene-butylene-styrene-copolymer (SEBS) having a styrene content of 18 mass % and a Type A durometer hardness of 67
2) Oil
   2a: Paraffin oil having a kinetic viscosity at 40° C. of about 380 mm$^2$/s
   2b: Saturated hydrocarbon-based oil (ethylene-α-olefin copolymer: MW≈1,400) having a kinetic viscosity at 40° C. of about 400 mm$^2$/s
   2c: Saturated hydrocarbon-based oil (ethylene-α-olefin copolymer: MW≈2700) having a kinetic viscosity at 40° C. of about 2,200 mm$^2$/s
   2d: Saturated hydrocarbon-based oil (ethylene-α-olefin-copolymer) having a kinetic viscosity at 40° C. of about 9,850 mm$^2$/s
   2e: Saturated hydrocarbon-based oil (ethylene-α-olefin-copolymer: MW≈7500) having a kinetic viscosity at 40° C. of about 37,500 mm$^2$/s
3) Inorganic Fillers
   3a: Calcium carbonate particles ($CaCO_3$)
4) Various Additives
   4a: Stearic acid (St-ac)
   4b: Zinc oxide (ac-ZnO)
   4c: Organic-based heat decomposition type foaming agent (azodicarbonamide (ADCA))
   4d: Homogenizing agent (synthetic resin, aliphatic hydrocarbon mixture (HN))
   4e: Dicumyl peroxide (DCP)
   4f: Triallyl isocyanurate (TAIC) (active component 60 mass %)

Preparation of Foam

Comparative Example 1 to Comparative Example 7

Foams were prepared with mixing ratios as shown in Table 1. The hardness (Asker C hardness), the density, and the compression set of each of the foams were measured. A foam having a hardness of less than 45 was judged as "○", a foaming having a hardness of more than 55 was judged as "x", and a foam having a hardness of an intermediate value therebetween (i.e., 45 or more 55 or less) was judged as "Δ". A foam having a compression set of 45% or less was judged as "○", a foam having a compression set of 50% or more was judged as "x", and a foam having a compression set of an intermediate value therebetween (i.e., more than 45% and less than 50%) was judged as "Δ". The results are collectively shown in Table 1.

TABLE 1

| | | C. Ex. 1 | C. Ex. 2 | C. Ex. 3 | C. Ex. 4 | C. Ex. 5 | C. Ex. 6 | C. Ex. 7 |
|---|---|---|---|---|---|---|---|---|
| 1a)EVA | VA = 15%, mp = 88° C. | 10 | 10 | 10 | 100 | | | |
| 1b)EVA | VA = 25%, mp = 77° C. | 90 | 60 | 60 | | | | |
| 1c)POE | | | | | | 100 | | |
| 1d)OBC | mp = 119° C. | | 30 | 30 | | | 100 | |
| 1e)TPS(SEBS) | | | | | | | | 100 |
| 2a) Paraffin oil | η ≈ 380 mm2/s | | | 10 | | | | |
| 2b)Saturated hydrocarbon-based oil | η ≈ 400 mm2/s | | | | | | | |
| 2c)Saturated hydrocarbon-based oil | η ≈ 2200 mm2/s | | | | | | | |
| 2d)Saturated hydrocarbon-based oil | η ≈ 9850 mm2/s | | | | | | | |
| 2e)Saturated hydrocarbon-based oil | η ≈ 37500 mm2/s | | | | | | | |
| 3a)CaCO3 | | 10 | 10 | 10 | 10 | 10 | 10 | 10 |
| 4a)stearic acid | | 1.0 | 1.0 | 1.0 | 1.0 | 1.0 | 1.0 | 1.0 |
| 4b)ac-ZnO | | 1.0 | 1.0 | 1.0 | 1.0 | 1.0 | 1.0 | 1.0 |
| 4c)ADCA | | 1.8 | 2.25 | 1.7 | 2.0 | 2.0 | 1.7 | 1.7 |
| 4d)HN | | 1.0 | 1.0 | 1.0 | 1.0 | 1.0 | 1.0 | 1.0 |

TABLE 1-continued

|  | C. Ex. 1 | C. Ex. 2 | C. Ex. 3 | C. Ex. 4 | C. Ex. 5 | C. Ex. 6 | C. Ex. 7 |
|---|---|---|---|---|---|---|---|
| 4e)DCP | 0.8 | 0.8 | 0.8 | 0.8 | 0.8 | 0.8 | 1.2 |
| 4f)TAIC(60%) |  | 0.2 | 0.2 |  | 0.2 | 0.2 | 0.2 |
| Hardness [°] | Δ52 | Δ47 | ○40 | x64 | x68 | ○40 | Δ45 |
| Density [g/cm3] | 0.205 | 0.207 | 0.198 | 0.190 | 0.186 | 0.198 | 0.198 |
| Compression set [%] | Δ45 | x49 | x56 | ○30 | ○25 | x50 | x52 |

Example 1 to Example 8

Foams were prepared with mixing ratios as shown in Table 2. The hardness (Asker C hardness), the density, and the compression set of each of the foams were measured. A foam having a hardness of less than 45 was judged as "○", a foaming having a hardness of more than 55 was judged as "x", and a foam having a hardness of an intermediate value therebetween (i.e., 45 or more 55 or less) was judged as "Δ". A foam having a compression set of 45% or less was judged as "○", a foam having a compression set of 50% or more was judged as "x", and a foam having a compression set of an intermediate value therebetween (i.e., more than 45% and less than 50%) was judged as "Δ". The results are collectively shown in Table 2.

It is evident from the above results that the foam has a low hardness and is excellent in characteristics relating to the compression set when the foam includes the hydrocarbon-based oil including ethylene and α-olefin as constituent units. That is, it is evident from the above results that the cushion excellent in cushioning properties can be obtained by the present invention.

Although the cushion and the shoe according to this embodiment are as described above, the present invention is not limited to the aforementioned embodiment and the design may be appropriately changed within the scope where the present invention is intended. Also, the functional effect of the present invention is not limited to the aforementioned embodiment. That is, the embodiments disclosed herein should be assumed as not limitations but exemplifi-

TABLE 2

|  |  | Ex. 1 | Ex. 2 | Ex. 3 | Ex. 4 | Ex. 5 | Ex. 6 | Ex. 7 | Ex. 8 |
|---|---|---|---|---|---|---|---|---|---|
| 1a)EVA | VA = 15%, mp = 88° C. | 10 | 10 | 10 | 10 | 100 |  |  |  |
| 1b)EVA | VA = 25%, mp = 77° C. | 60 | 60 | 60 | 60 |  |  |  |  |
| 1c)POE |  |  |  |  |  |  | 100 |  |  |
| 1d)OBC | mp = 119° C. | 30 | 30 | 30 | 30 |  |  | 100 |  |
| 1e)TPS(SEBS) |  |  |  |  |  |  |  |  | 100 |
| 2a) Paraffin oil | η ≈ 380 mm2/s |  |  |  |  |  |  |  |  |
| 2b)Saturated hydrocarbon-based oil | η ≈ 400 mm2/s | 10 |  |  |  |  |  |  |  |
| 2c)Saturated hydrocarbon-based oil | η ≈ 2200 mm2/s |  | 10 |  |  |  |  |  |  |
| 2d)Saturated hydrocarbon-based oil | η ≈ 9850 mm2/s |  |  | 10 |  |  |  |  |  |
| 2e)Saturated hydrocarbon-based oil | η ≈ 37500 mm2/s |  |  |  | 10 | 10 | 10 | 10 | 10 |
| 3a)CaCO3 |  | 10 | 10 | 10 | 10 | 10 | 10 | 10 | 10 |
| 4a)stearic acid |  | 1.0 | 1.0 | 1.0 | 1.0 | 1.0 | 1.0 | 1.0 | 1.0 |
| 4b)ac-ZnO |  | 1.0 | 1.0 | 1.0 | 1.0 | 1.0 | 1.0 | 1.0 | 1.0 |
| 4c)ADCA |  | 1.8 | 1.8 | 1.8 | 1.7 | 2.0 | 2.0 | 1.7 | 1.7 |
| 4d)HN |  | 1.0 | 1.0 | 1.0 | 1.0 | 1.0 | 1.0 | 1.0 | 1.0 |
| 4e)DCP |  | 0.8 | 0.8 | 0.8 | 0.8 | 0.8 | 0.8 | 0.8 | 1.2 |
| 4f)TAIC(60%) |  | 0.2 | 0.2 | 0.2 | 0.2 |  | 0.2 | 0.2 | 0.2 |
| Hardness [°] |  | ○40 | ○39 | ○39 | ○40 | Δ55 | Δ55 | ○30 | ○40 |
| Density [g/cm3] |  | 0.198 | 0.198 | 0.196 | 0.198 | 0.190 | 0.186 | 0.205 | 0.195 |
| Compression set [%] |  | Δ49 | ○39 | ○38 | ○41 | ○45 | ○42 | ○45 | ○40 |

The following table shows the results of the comparison of, among the above results, Comparative Example 2 in which no hydrocarbon-based oil was mixed, and Examples 1 to 4 in which hydrocarbon-based oils having different kinetic viscosities were respectively mixed.

TABLE 3

|  | Hydrocarbon-based oil | Hardness[°] | Compression set [%] |
|---|---|---|---|
| C. Ex. 2 | Nil | 47 | 49 |
| Ex.1 | Included (η ≈ 400 mm2/s) | 40 | 49 |
| Ex.2 | Included (η ≈ 2200 mm2/s) | 39 | 39 |
| Ex.3 | Included (η ≈ 9850 mm2/s) | 39 | 39 |
| Ex.4 | Included (η ≈ 37500 mm2/s) | 40 | 41 | cations in all aspects. The scope of the present invention is described not by the above description but by the claims. Further, the scope of the present invention is intended to include the scope equivalent to the claims and all the changes in the claims.

What is claimed is:

1. A shoe comprising a shoe sole that comprises a cushion partially or entirely composed of a foam, wherein
   the foam is composed of:
   a hydrocarbon-based oil comprising ethylene and α-olefin as constituent units; and
   a polymer composition comprising one or a plurality of polymers, and
   the polymer composition comprises inorganic fillers at a ratio of 1 mass % or more and 20 mass % or less based on the total mass of the one or plurality of polymers, and a kinetic viscosity of the hydrocarbon-based oil at 40° C. is 500 mm²/s or greater.

2. The shoe according to claim 1, wherein the hydrocarbon-based oil is a saturated hydrocarbon-based oil.

3. The shoe according to claim 1, wherein the polymer composition further comprises one or more selected from the group consisting of ethylene-vinyl acetate copolymer, ethylene-α-olefin block copolymer, ethylene-α-olefin random copolymer, and styrene-based thermoplastic elastomer.

4. The shoe according to claim 3, wherein the hydrocarbon-based oil is a saturated hydrocarbon-based oil.

5. The shoe according to claim 3, wherein the polymer composition further comprises the ethylene-vinyl acetate copolymer.

6. The shoe according to claim 5, wherein the hydrocarbon-based oil is a saturated hydrocarbon-based oil.

\* \* \* \* \*